United States Patent [19]

Schwarz

[11] 4,147,381
[45] Apr. 3, 1979

[54] PIPE COUPLING

[76] Inventor: Walter Schwarz, Engerthstr. 237b, A-1020 Wien II, Austria

[21] Appl. No.: 818,321

[22] Filed: Jul. 22, 1977

[30] Foreign Application Priority Data

Jul. 23, 1976 [AT] Austria ............................. 5452/76

[51] Int. Cl.² ............................................ F16L 11/12
[52] U.S. Cl. ...................................... 285/53; 285/293; 285/371; 138/109; 138/155
[58] Field of Search ................ 285/53, 293, 369, 371, 285/47, 383, 398, 417; 138/109, 120, 124, 125, 129, 132, 133, 137, 138, 140, 141, 155, DIG. 3

[56] References Cited

U.S. PATENT DOCUMENTS

| 2,331,504 | 10/1943 | Raymond et al. ................ 29/446 |
| 2,363,967 | 11/1944 | Jasper ................................. 138/140 |
| 3,131,725 | 5/1964 | Chyle ................................. 138/140 |
| 3,432,186 | 3/1969 | Braun ................................. 285/53 |
| 3,905,398 | 9/1975 | Johansen et al. ............. 138/137 X |
| 3,993,331 | 11/1976 | Schwarz ............................ 285/53 |

FOREIGN PATENT DOCUMENTS 329333  7/1975  Austria .............................. 285/53

Primary Examiner—Werner H. Schroeder
Assistant Examiner—C. J. Arbes
Attorney, Agent, or Firm—Karl F. Ross

[57] ABSTRACT

Two coaxial metal pipes, whose confronting extremities are each provided with a plurality of peripheral ribs of staggered height separated by two or more peripheral grooves, are interconnected by a coupling sleeve of fiber-reinforced thermosetting resin subdivided into several coaxially interleaved and independently deformable cylindrical shells each terminating in a pair of internal beads engaged in a respective peripheral pipe groove. The shells, increasing in axial tensile strength from the innermost to the outermost one, are preferably separated from one another by interposed antibonding layers of thermoplastic resin. A resinous filler can be inserted between the pipe extremities for electrically insulating them from each other. The shells of the coupling sleeve can be formed by coiling resin-coated filaments around the pipe axis, advantageously with application of an antifriction layer on each inner shell before the thermosetting material thereof has been fully hardened.

14 Claims, 6 Drawing Figures

PIPE COUPLING

FIELD OF THE INVENTION

My present invention relates to a pipe coupling of the type wherein a sleeve of filament-reinforced thermosetting resin overlappingly engages a terminal portion of a conduit to be connected with an external member, e.g. a second conduit coaxial therewith.

BACKGROUND OF THE INVENTION

It is known, e.g. from Austrian Pat. No. 320,362, to establish a positive connection between a pipe extremity and a resinous coupling sleeve overlapping same by forming that pipe extremity with a peripheral groove which is bounded by a peripheral rib on the side of the free end of that extremity, the sleeve having an inner peripheral bead engaging in the complementarily shaped pipe groove. More than one groove and rib can be provided on the same pipe extremity, e.g. as suggested in Austrian Pat. No. 329,333, with the coupling sleeve forming a corresponding number of peripheral beads respectively engaging in these grooves while overlapping the associated ribs. The coupling sleeve can be produced by coiling, casting or compression-molding.

Even with the use of hardened thermosetting materials such as epoxy resins reinforced by filaments in the form of rovings or whiskers of quartz glass, for example, a coupling sleeve of this description is susceptible to cracking under strong tensile and/or torsional stresses. The cracks tend to develop on the inner surface of a peripheral bead and to progress outwardly at an angle to the radial direction, as established by tests. Thus, the mechanical strength of the body of the sleeve can be utilized only in part.

OBJECTS OF THE INVENTION

An object of my present invention, therefore, is to provide a pipe coupling of the type referred to which obviates this drawback.

A related object is to provide a convenient method of making such an improved pipe coupling.

SUMMARY OF THE INVENTION

In accordance with my present invention, a coupling sleeve of filament-reinforced thermosetting resin is radially subdivided into a plurality of independently deformable shells which are centered on the conduit axis and carry inner peripheral beads respectively engaging in the peripheral grooves of the terminal conduit portion, the axial strength of these shells increasing progressively from the innermost to the outermost one.

In the aforedescribed conventional pipe couplings of the multibead type, in which the radial height of the ribs of a pipe extremity increases progressively with distance from the free end of that extremity, the coupling sleeve must have a substantial wall thickness in order that its own end portion may be similarly staggered to reach around the several ribs. If the ratio of the inner sleeve diameter to this wall thickness becomes less than a critical value, roughly equal to 10:1, the difference between the modulus of elasticity of the thermosetting material and that of the embedded reinforcing filaments (whose ratio is about 12:1 in the case of glass rovings and epoxy resins) so weakens the composite structure that cracks are bound to occur. With several independently deformable shells according to the present invention, each terminating in a single inner peripheral bead at one or both ends, each shell can be so designed that the ratio of its inner diameter to its individual wall thickness remains above the critical limit. Since that inner diameter increases from the innermost to the outermost shell, a corresponding increase in their wall thicknesses is permissible. It should be noted, however, that the desired step-up of axial tensile strength can be achieved not only by a progressive thickening of the shells but also through the use of more and/or stronger reinforcements.

Advantageously, pursuant to another feature of my invention, adjacent shells of the composite sleeve are at least partially separated from each other by an interposed antifriction layer to enhance their independent deformability. That antifriction layer may consist, essentially, of a thermoplastic resin such as polytetrafluoroethylene (Teflon), for example, or of a foam polymer of either thermoplastic or thermosetting character having a relatively low shear resistance. If desired, such a foam polymer could also be sandwiched between a pair of solid and preferably resinous foils made of Teflon, for example. Since the problem of cracking arises mainly in the region of the conduit-engaging sleeve end or ends, the antifriction layer may be confined to the vicinity of an overlapped conduit portion and may terminate short of the opposite end of the coupling sleeve.

In producing a coupling sleeve according to my invention in situ, as by winding, casting or compression-molding the filament-reinforced thermoplastic resin around the terminal portion or portions of the conduit or conduits concerned, care must be taken to prevent any undesirable bonding between the successively formed shells. If an inner shell is allowed to harden completely before the next outer shell is formed thereon, such bonding will generally not occur. With the use of an interposed antifriction layer as discussed above, however, the process can be expedited since that layer—especially when of the aforedescribed sandwich type—can be deposited on an inner shell even when the latter is only in a partially hardened state, i.e., prior to final setting.

Pipes equipped with couplings according to my invention may be used for a variety of purposes, including the conveyance of fluids and the shielding of electrical conductors. Thus, my invention is applicable to pipelines, ducts for high-pressure water or steam, connections between rocket tubes and associated combustion chambers, transformer stations with cascaded modules, spark-quenching chambers, and the like.

BRIEF DESCRIPTION OF THE DRAWING

The above and other features of my invention will now be described in detail with reference to the accompanying drawing in which:

FIG. 4 is a perspective view of a foil usable as an antifriction layer in a coupling according to my invention;

FIG. 5 is a fragmentary sectional view of another antifriction layer; and

FIG. 6 is a view similar to FIG. 1, drawn to a larger scale and illustrating certain modifications.

SPECIFIC DESCRIPTION

Figure 1:
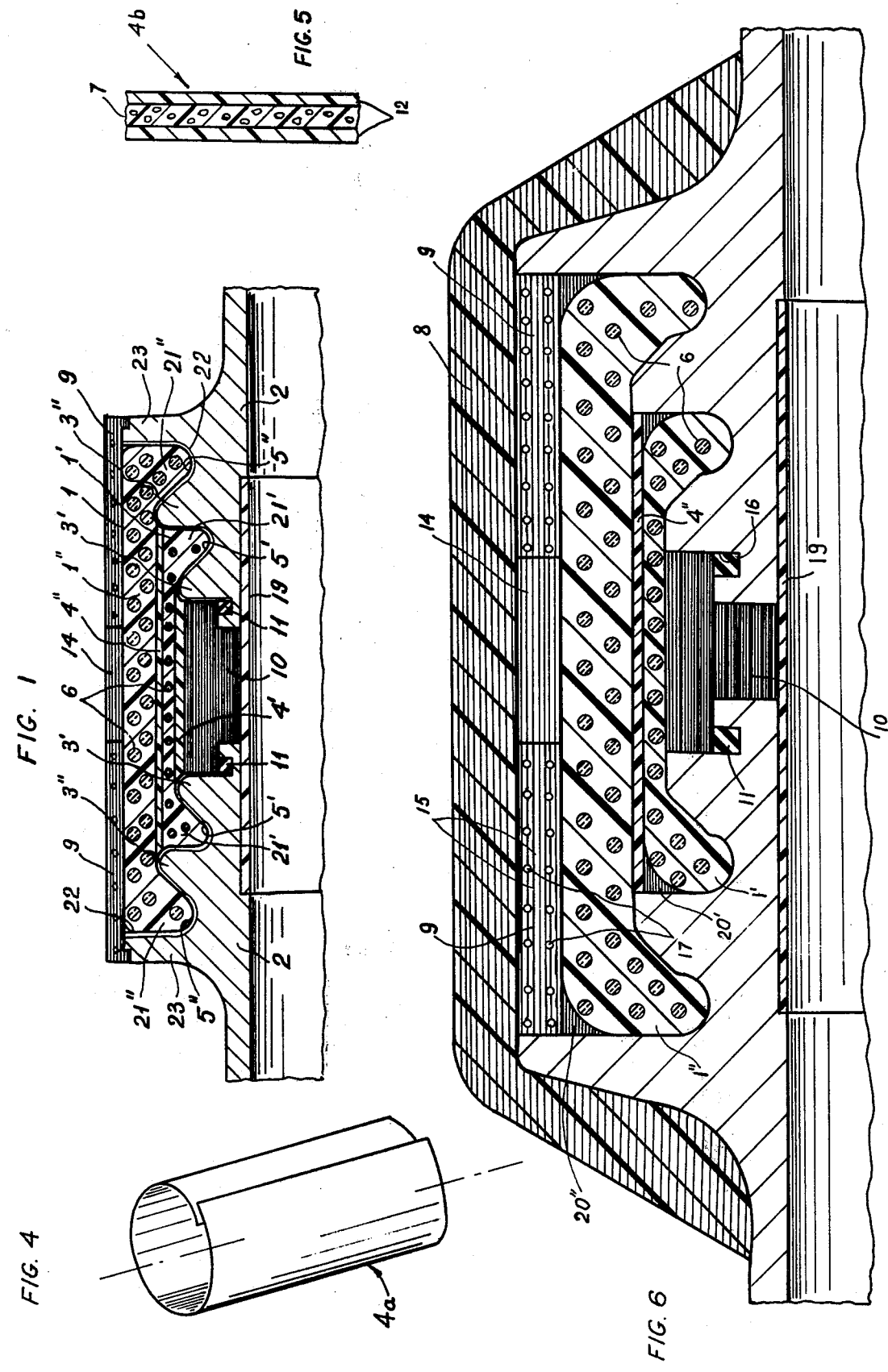
FIG. 1 is a longitudinal sectional view of a representative portion of a coupling embodying my invention, serving to interconnect a pair of coaxial conduits.
Figure 2:
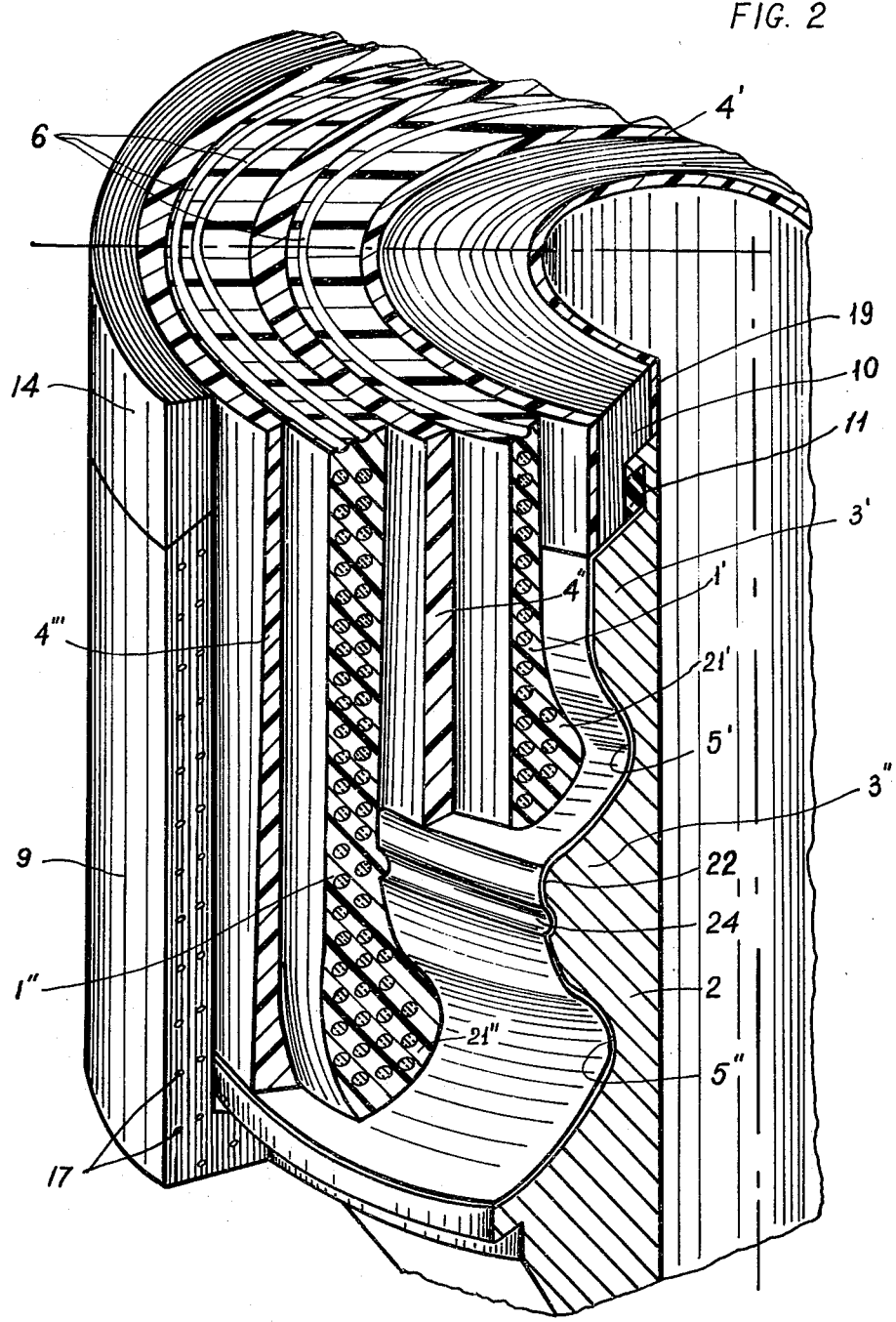
FIG. 2 is a fragmentary perspective view of one half of the coupling shown in FIG. 1.

In FIGS. 1 and 2 I have shown the confronting terminal portions 2 of a pair of coaxial pipes, not further illustrated, which are designed as flanged extremities each formed with a pair of peripheral grooves 5', 5" bounded by respective peripheral ribs 3', 3" on the side of the free end of that extremity. The boundary of the second groove 5" remote from that free end is a radial flange 23. It will be apparent that the ribs 3', 3" and the flange 23 can be integral with the pipe body, as shown, the intervening grooves 5' and 5" being then formed by machining; alternatively, the ribs and/or the flange can be preformed as separate rings welded or otherwise secured to the pipe. The two pipe ends are axially separated by a filler 10 which is preferably laminated, as shown, and consists of synthetic resin or other dielectric material if the two pipes are to be electrically insulated from each other. Rib 3", remote from the gap separating the two pipes, is of greater outer radius than rib 3' proximal to that gap.

The flanged pipe extremities 2 are advantageously provided with a protective coating 22 serving as a leakage-current inhibitor; this coating may consist of a sacrificial metal such as zinc or aluminum, of a ceramic material such as magnesium silicate or titanium dioxide, or of organic substances. The coating can be conventionally applied by vapor deposition (e.g. in a vacuum), sintering, thermal adhesion or flame-spraying. Sealing rings 11 of natural or synthetic rubber are inserted in grooves 16 between filler 10 and the adjoining pipe ends.

In accordance with my present invention, the two pipe extremities 2 are flexibly but firmly interconnected by a composite coupling sleeve 1 of thermosetting material, e.g. an epoxy resin, reinforced by embedded glass fibers or similar filaments 6 as is well known per se. The sleeve 1 is radially subdivided into an inner shell 1' and an outer shell 1" separated by an antifriction layer 4", a similar layer 4' being interposed between shell 1' and filler 10.

Inner shell 1' ends in a pair of inner peripheral beads 21' engaging in the respective grooves 5' of the two pipe extremities 2. Outer shell 1" has similar peripheral beads 21" engaging in the grooves 5" of these pipe ends. The positive interengagement of the shells and the pipe ends can be further enhanced by providing their contacting surfaces with mating projections and indentations, e.g. as shown at 24 in FIG. 2. Shell 1" is of higher axial tensile strength than shell 1', as indicated in the drawing by its greater wall thickness; as already pointed out, however, such difference in wall thickness is not essential inasmuch as the outer shell can be strengthened with reference to the inner shell by a suitable choice of reinforcements.

For the antifriction layers 4' and 4" I may use, besides Teflon, various foam polymers (e.g. foam polyurethane) or a polycarbonate. They can be applied as foils, wound about the filler 10 and the inner shell 1', or by spraying, pasting, foaming in situ and other conventional techniques. If prefabricated as a foil or sheet, as shown at 4a in FIG. 4, such a layer may be rolled into a longitudinally slitted cylinder which is then wrapped about its inner support, i.e. about the filler 10 or the shell 1'. A composite separating layer 4b, shown in FIG. 5, may have a core 7 of low shear resistance, e.g. a foam elastomer or a polyester/polyurethane mixture, sandwiched between a pair of outer foils 12. Such a composite layer is particularly advantageous with pipe couplings of large diameter, e.g. upward of half a meter. Such a core 7 of polyester/polyurethane mixture remains plastic even after having been exposed to a hardening temperature of more than 300° C.; thus, it could also be utilized directly between the thermosetting shells 1' and 1", without the foils 12.

If the conduits interconnected by the coupling sleeve 1 carry a fluid, outward leakage thereof at the joint may be prevented by the antifriction layers themselves and/or by a separate, penetration-resistant barrier layer in contact with at least one of the peripheral shell surfaces, such a barrier layer having been shown at 19 in FIGS. 1 and 2. Layer 19 may consist, for example, of a modified bitumen-alkylene copolymer such as the one marketed under the name LUCOBIT KR 1210 by BASF Co. Other suitable materials include epoxy resins, polyurethane, silicone elastomers, fluorosilicone rubber, polyethylene, polypropylene or fluoroethylene/propylene (FEP), for example.

As further shown in FIGS. 1 and 2, the ends of sleeve 1 overlapping the pipe extremities 2 are enveloped in a manner known per se by sheaths 9 which can also be laminated from foils 15 and reinforced by filaments 17, e.g. steel fibers with a diameter of 0.012 mm or carbon fibers with a diameter of about 0.009 mm, preferably having a modulus of elasticity ranging between 3,500,000 and 4,200,000 kg/cm$^2$. The purpose of sheaths 9 is to hold the beads 21' and 21" in firm engagement with the grooved pipe extremities 2. A second barrier layer 14, which may be similar to barrier layer 19, is shown wrapped around the central part of sleeve 1 between sheaths 9.

The sheaths 9, the filler 10 and/or the layers 14, 19 can be wound from foil in the same manner as layers 4', 4". FIG. 2 also shows a third antifriction layer 4''' interposed between shell 1" and layers 9, 14.

The shells 1' and 1" can be conveniently formed by drawing the reinforcing filaments, indicated at 6, through a bath of liquid resin and winding the filaments so impregnated about the pipe extremities 2 for the inner shell 1' and about the separating layer 4" for the outer shell 1". Any convenient winding mode, linear or not, can be used for this purpose. Advantageously, in the case of the inner shell 1', a start is made by coiling the filament about a solid mandrel whose outer radius conforms to that of layer 4', with substitution of the filler 10 and its coating 4' for that mandrel as soon as the coil body has become self-supporting whereupon the coil is extended beyond the ribs 3' of the two pipe ends.

Figure 3:
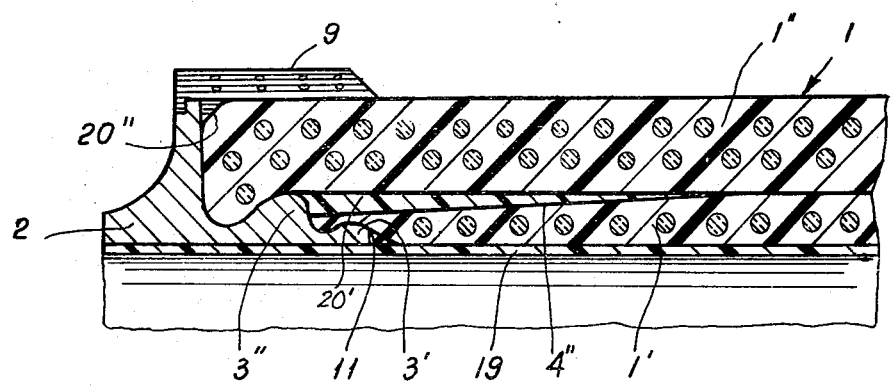
FIG. 3 is a view similar to part of FIG. 1, illustrating a modification.

The ribs 3' and 3" are advantageously of substantially identical cross-section in order to simplify their production. They need not, however, be of undulating profile as shown in FIGS. 1-3, but could also be essentially sawtooth-shaped as illustrated in FIG. 6. If necessary, laminated wedge portions 20', 20" can be separately wound to fill the spaces between the shells and the groove boundaries. The latter Figure also shows an insulating envelope 8, e.g. a winding of friction tape, surrounding the entire assembly 1, 2.

In FIG. 3 I have illustrated the possibility of limiting the extent of an antifriction layer 4" to the immediate vicinity of the grooved pipe extremity 2; thus, with two interconnected pipes as shown in FIG. 1, the layer could be split into two axially spaced-apart portions at opposite ends of sleeve 1. If the length of the coupling sleeves is many times greater than the pipe diameter, such a foreshortened layer 4" may terminate at a distance of not more than about 6 pipe diameters as measured from the first rib 3'.

The divided coupling sleeve according to my invention is mechanically stronger than similarly dimensioned integral sleeves of the prior art and avoids the generation of local stress concentrations liable to cause cracking.

I claim:

1. In combination, a conduit with a terminal portion having a plurality of peripheral grooves bounded by peripheral ribs whose height decreases toward the free end of said terminal portion, and a coupling sleeve of filament-reinforced thermosetting resin overlappingly connecting said terminal portion with an external member, said coupling sleeve being radially subdivided into a plurality of relatively shiftable and thus independently deformable shells centered on the conduit axis and carrying inner peripheral beads respectively engaging in said peripheral grooves, said shells being of progressively increasing axial tensile strength from the innermost shell to the outermost shell.

2. The combination defined in claim 1 wherein adjacent shells of said sleeve are at least partially separated from each other by an antifriction layer.

3. The combination defined in claim 2 wherein said antifriction layer consists essentially of thermoplastic resin.

4. The combination defined in claim 3 wherein said thermoplastic resin is polytetrafluoroethylene.

5. The combination defined in claim 2 wherein said antifriction layer includes a foam polymer.

6. The combination defined in claim 5 wherein said anti-friction layer further includes a pair of solid foils sandwiching said foam polymer between them.

7. The combination defined in claim 2 wherein said anti-friction layer comprises a longitudinally slitted sheet.

8. The combination defined in claim 3 wherein said anti-friction layer is confined to the vicinity of said terminal portion and terminates short of the opposite end of said coupling sleeve.

9. The combination defined in claim 1, further comprising an envelope surrounding said sleeve at least in the region of overlap of said terminal portion.

10. The combination defined in claim 1 wherein said conduit is metallic and is provided on said terminal portion with a protective coating.

11. The combination defined in claim 1, further comprising a penetration-resistant barrier layer coaxially adjoining at least one of said shells.

12. The combination defined in claim 1 wherein said external member is another conduit coaxial with the first-mentioned conduit and provided with a terminal portion substantially duplicating the terminal portion of said first-mentioned conduit in a mirror-symmetrical manner, said sleeve overlappingly spanning the two terminal portions, each of said shells terminating at opposite ends in a pair of beads engaging in respective peripheral grooves of said terminal portions.

13. The combination defined in claim 12, further comprising a filler inserted between said terminal portions and surrounded by said coupling sleeve.

14. The combination defined in claim 13 wherein said filler consists of electrically insulating material.

* * * * *